United States Patent [19]
Sarantakis

[11] 3,882,098

[45] May 6, 1975

[54] SYNTHESIS OF DES-ALA[1], GLY[2], ASN[5]-SRIF AND INTERMEDIATES

[75] Inventor: Dimitrios Sarantakis, Audubon, Pa.

[73] Assignee: American Home Products Corporation, New York, N.Y.

[22] Filed: Jan. 3, 1974

[21] Appl. No.: 430,441

[52] U.S. Cl. ............................. 260/112.5; 424/177
[51] Int. Cl. ...................... C07c 103/52; C07g 7/00
[58] Field of Search ................................ 260/112.5

[56] References Cited
OTHER PUBLICATIONS
Brazeau et al.: Science, 179, 77–9 (1973).
G. R. Pettit, "Synthetic Peptides," Vol. 1, Van Nostand, Reinhold Co., New York (1970), pp. 101, 464.

*Primary Examiner*—Elbert L. Roberts
*Assistant Examiner*—Reginald J. Suyat

[57] ABSTRACT

The undecapeptide H-Cys-Lys-Phe-Phe-Trp-Lys-Thr-Phe-Thr-Ser-Cys-OH, its oxidized form and intermediates obtained in such synthesis are described. The oxidized form of this undecapeptide inhibits the secretion of the hormone somatotropin.

6 Claims, No Drawings

SYNTHESIS OF DES-ALA[1], GLY[2], ASN[5]-SRIF AND INTERMEDIATES

This invention relates to novel undecapeptides and intermediates used in their synthesis by the classical method of peptide synthesis.

Somatostatin (also known as somatotropin release inhibiting factor-SRIF) is the tetradecapeptide.

H-Ala-Gly-Cys-Lys-Asn-Phe-Phe-Trp-Lys-Thr-Phe-Thr-Ser-Cys-OH.

This tetradecapeptide has only recently been identified by isolation from extracts of ovine hypothalamic tissues and found to inhibit the secretion of the hormone somatotropin which is commonly referred to as the growth hormone (GH); See Brazeau et al., Science, 179 pp 77–79 (January 1973). The linear form of this tetradecapeptide H-Ala-Gly-Cys-Lys-Asn-Phe-Phe-Trp-Lys-Thr-Phe-Thr-Ser-Cys-OH, has also been reported by Brazeau et al., supra, to have been synthesized by solid phase methodology and found to have the same biological activity as the somatostatin obtained from a natural source.

The novel undecapeptides of the present invention are analogs of somatostatin and the linear counterpart of somatostatin in which the amino acids in the one, two and five position of somatostatin have been omitted.

The nomenclature used to depict the peptides follow that shown is by Schroder & Lubke, "The Peptides," 1 pp viii–xxix (Academic Press 1965) and in accordance with such nomenclature, it is the L form of the amino acid that is intended, unless otherwise expressly indicated.

The undecapeptide of the present invention which inhibits the secretion of the hormone somatotropin is represented by the formula:

H-Cys-Lys-Phe-Phe-Trp-Lys-Thr-Phe-Thr-Ser-Cys-OH (I)

and the non-toxic acid addition salts of such compounds.

Illustrative of acid addition salts are hydrochloride, hydrobromide, sulfate, phosphate, maleate, acetate, citrate, benzoate, succinate, malate, ascorbate, and the like.

The present invention also relates to novel undecapeptide intermediates of the formula:

H-Cys-Lys-Phe-Phe-Trp-Lys-Thr-Phe-Thr-Ser-Cys-OH (II)

and

R-Cys($R^1$)-Lys($R^2$)-Phe-Phe-Trp-Lys($R^2$)-Thr($R^3$)-Phe-Thr($R^3$)-Ser($R^4$)-Cys($R^1$)-O$R^5$ (III)

wherein:

R is either hydrogen or an α-amino protecting group. The α-amino protecting groups contemplated by R are those known to be useful in the art in the step-wise synthesis of polypeptides. Among the classes of α-amino protecting groups covered by R are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethan protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R is tert-butyloxycarbonyl;

$R^1$ is a protecting group for the sulfhydryl group on the cysteinyl amino acid residue in the undecapeptide. Illustrative of $R^1$ is a group selected from the class consisting of benzyl; substituted benzyl wherein the substituent is at least one of methyl, methoxy, nitro (e.g. p-methylbenzyl, p-nitrobenzyl, 2,4,6-trimethylbenzyl, etc.,); trityl, benzyloxycarbonyl, benzhydryl, p-methoxybenzyloxycarbonyl, benzylthiomethyl, ethylcarbonyl, thioethyl, tetrahydropyranyl, acetamidomethyl, benzoyl, sulfate salt, etc.

$R^2$ is a protecting group for the side chain amino substituent of lysine or $R^2$ is hydrogen which means there is no protecting group on the side chain amino substituent. Illustrative of suitable side chain amino protecting groups are benzyl, chlorobenzyloxycarbonyl, benzyloxycarbonyl, tosyl, 2,4 dinitrophenyl, t-amyloxycarbonyl, t-butyloxycarbonyl, etc. The selection of such a side chain amino protecting group is not critical except that it must be one which is not removed during cleavage of the α-amino protecting group during the synthesis until the peptide of the desired amino acid sequence is obtained. Hence, the α-amino protecting and side chain amino protecting group cannot be the same;

$R^3$ and $R^4$ are protecting groups for the alcoholic hydroxyl group of threonine and serine and is selected from the class consisting of acetyl, tosyl, benzoyl, tert-butyl, trityl, benzyl and benzyloxycarbonyl. The preferred protecting group is benzyl; or $R^3$ and $R^4$ is hydrogen which means there is no protecting group on the alcoholic hydroxyl function; the selection of these protecting groups is not critical except that it must be one which is not removed during cleavage of the α-amino protecting group during the synthesis until the peptide of the desired amino acid sequence is obtained;

$R^5$ is α-carboxyl protecting group which is stable under the process conditions used to remove the α-amino protecting group until the peptide of the desired chain length has been formed. Illustrative of $R^5$ is a group selected from the class consisting of $C_1$–$C_6$ alkyl (e.g. methyl, ethyl, butyl, pentyl, isobutyl, etc.,); benzyl; substituted benzyl wherein the substituent is selected from at least one of nitro, methoxy and methyl (e.g. p-methoxybenzyl, p-nitrobenzyl, 2,4-dimethoxybenzyl, 2,4,6-trimethylbenzyl, pentamethylbenzyl), phenacyl, phthalimidomethyl, β-methylthioethyl, 4-picolyl and 4-(methylthio)phenyl. Preferably $R^5$ is $C_1$–$C_6$ alkyl, benzyl or substituted benzyl.

Also contemplated within the scope of the present invention are dipeptide intermediates of the formula:

$R^7$-Cys($R^1$)-Lys($R^2$)-O$R^6$ (IV)

wherein:

$R^1$ and $R^2$ have the same meaning as previously defined in connection with formula III; $R^7$ is an α-amino protecting group as previously defined; and $R^6$ is either hydrogen or is selected from a member defined by $R^5$, supra.

The undecapeptides of formulas I through III are prepared in accordance with the reaction scheme shown in the flow diagram appended hereto. With reference to such flow diagram the compound of Formula A, R-Thr($R^3$)-Ser($R^4$)-OH is reacted with a carboxyl group activating reagent to form a carboxyl group activated derivative of the compound of Formula A which is then coupled with a carboxylic acid ester of cysteine (Formula B) at a temperature between about −30° and +30°C to form a compound of Formula C. The compound of Formula B, which is preferably in the form of a salt, may be present in the reaction medium while the carboxyl group activated derivative of a compound of Formula (A) is being formed or it may be added to the reaction vessel after the activated compound has been formed. The coupling is carried out throughout the synthesis in the presence of a inert organic solvent such as dichloromethane, acetonitrile, dimethylformamide, chloroform, dioxane, toluene, methylene chloride, etc. If the compound of Formula B is added to the reaction medium as an acid addition salt, an acid acceptor is included in the reaction medium so that a free base is formed in situ which reacts with the activated derivative of a compound of Formula A. Suitable acid acceptors include tertiary amines (e.g. triethylamine, pyridine, quinoline, dimethylaniline, etc.,) alkali metal carbonates or other acid binding agents known in the art.

Following the formation of a compound of formula (C), the α-amino protecting group on threonine is then cleaved to yield the tripeptide of formula (D). The cleaving reagent is one which will remove the α-amino protecting group without cleavage of the side chain protecting groups. A particular suitable reagent is trifluoroacetic acid which will cleave tert-butyloxycarbonyl off the α-amino group but not benzyl or substituted benzyl side chain protecting groups. Other standard cleaving reagents are described by Schroder & Lubke, supra, pp 72–74.

The tripeptide of formula (D) is then coupled with the dipeptide of formula (E) after the free carboxyl group of the latter has been activated as previously described, this reaction being carried out in the same manner as described in connection with the formation of the tripeptide of formula (C). Following the formation of the pentapeptide of formula (F), the α-amino protecting group is cleaved off threonine using trifluoroacetic acid or other suitable cleaving reagent to form a compound of formula (G), which may be in the form of a salt, depending on the nature of the cleaving reagent used. This pentapeptide is coupled with a carboxyl group activated derivative of a compound of formula (H) to obtain the nonapeptide of formula (J) which is then treated with a suitable cleaving reagent such as trifluoroacetic acid to form a salt of a compound of formula (K). This nonapeptide is then coupled with a dipeptide of formula (L) which has its carboxyl group activated with a carboxyl group activating reagent to form the undecapeptide of formula (M). Thereafter, the side chain protecting groups $R^1, R^2, R^3$ and $R^4$ and the α-amino protecting group are cleaved and the ester is converted to the corresponding acid as represented by formula (II). The cleavage of the side chain protecting groups, α-amino protecting group and formation of the free acid may be accomplished in a single step or may be performed step-wise depending on the selection of the cleaving reagent. A particular suitable reagent is liquid hydrogen fluoride. If desired trifluoroacetic acid can be used to remove the α-amino protecting group followed by treatment with sodium in liquid ammonia.

As previously indicated, the activating reagents used in the aforedescribed synthesis are those well known in the peptide art. Illustrative of these are: (1) carbodiimides (e.g. N,$N^1$-dicyclohexycarbodiimide, N-ethyl $N^1$-(γ-dimethylamino propyl carbodiimide); (2) cyanamides (e.g. N,N-dibenzylcyanamide; (3) keteimines; (4) isoxazolium salts (e.g. N-ethyl-5-phenyl isoxazolium-$3^1$-sulfonate; (5) monocyclic nitrogen containing heterocyclic amides of aromatic character containing one through four nitrogens in the ring such as imidazolides, pyrazolides, 1,2,4-triazolides. Specific heterocyclic amides that are useful include N,$N^1$-carbonyl diimidazole N,$N^1$-carbonyl-di-1,2,4-triazole; (6) alkoxylated acetylene (e.g. ethoxyacetylene); (7) reagents which form a mixed anhydride with the carboxyl moiety of the amino acid (e.g. ethylchloroformate, isobutylchloroformate) and (8) nitrogen-containing heterocyclic compounds having a hydroxy group on one ring nitrogen (e.g. N-hydroxyphthalimide, N-hydroxysuccinimide, 1-hydroxybenzotriazole). Other activating reagents and their use in peptide coupling are described by Schroder & Lubke supra, in Chapter III and by Kapoor, J. Pharm. Sci., 59, pp 1–27, (1970).

A particular suitable activating system for a compound of formula (A) is the use of the combination of N,$N^1$-dicyclohexylcarbodiimide (DCC) and N-hydroxybenzotriazole which minimizes racemization. In subsequent activating and coupling reactions, the combination of DCC and N-hydroxysuccinimide is preferred.

In selecting a particular side chain protecting group to be used in the synthesis of the peptides of formula (I), the following rules should be following: (a) the protecting group must be stable to the reagent and under the reaction conditions selected for removing the α-amino protecting group at each step of the synthesis, (b) the protecting group must retain its protecting properties (i.e. not be split off under coupling conditions), and (c) the side chain protecting group must be removable upon the completion of the synthesis containing the desired amino acid sequence under reaction conditions that will not alter the peptide chain.

The compound of formula (I) is obtained by air oxidation of a compound of formula (II). This reaction is preferably carried out by a surface oxidation as described in Example 19.

The following examples are illustrative of the preparation of the undecapeptides of the present invention.

EXAMPLE 1

N-tert-Butyloxycarbonyl-S-p-Methoxybenzyl-L-Cysteine-$N^\epsilon$-Benzyloxy-carbonyl-L-Lysine Methyl Ester BOC-Cys(SMBzl)OH (34.1 gr, 0.1 mole) is dissolved in tetrahydrofuran (250 ml) and mixed with N-methylmorpholine (11 ml) then cooled at −20°C and treated with isobutylchloroformate (13.6 ml) under stirring. The reaction mixture is stirred for 5 minutes then a solution of N$^\epsilon$-benzyloxycarbonyl-L-lysine methyl ester hydrochloride salt (33 gr., ca 0.1 mole) and N-methylmorpholine (11 ml) in dimethylformamide (200 ml) is added and allowed to reach room temperature overnight. The N-methylmorpholine hydrochloride salt which separates is filtered off and the filtrate evaporated to dryness. The residue is partitioned between ethyl acetate and water and the organic phase was washed with 5 percent citric acid, water, 5 percent Na$_2$CO$_3$, water, dried over Na$_2$SO$_4$ and evaporated to dryness. The residue is crystallized from EtOAc-Et$_2$O-Hexane to afford a crystalline mass including solvent. The compound can be recrystallized from EtOAc-Et$_2$O or methanol. The yield of the above-titled product is 53 gr (86 percent).

R$_f$ (CHCl$_3$-Methanol 25:1) 0.65; R$_f$ (CHCl$_3$-Methanol, 10:1) 0.85.

EXAMPLE 2

N-tert-Butyloxycarbonyl-S-p-methoxybenzyl-L-Cysteinyl-N$^\epsilon$-benzyloxycarbonyl-L-Lysine BOC-Cys(SMBzl)-Lys(Cbz)OMe (14.2 gr, 23 m moles) from Example 1 is dissolved in methanol (ca. 100 ml) and treated with N-NaOH solution (26 ml) for 4 hours by which time no dipeptide ester can be detected. Most of the methanol is evaporated in vacuo and the residue is acidified with 5 percent KHSO$_4$ then extracted with ethyl acetate. The organic phase is washed with water, dried over Na$_2$SO$_4$ and evaporated to dryness. The residue is crystallized from ethyl acetate-hexane on standing for several hours to yield 11.1 gr of the above-titled product (85 percent); mp. 113°–114°C.

Anal. Cald. for C$_{30}$H$_{41}$N$_3$SO$_8$ (603.6): C 59.69, H 6.85, N 6.96. Found: C 59.28, H 6.80, N 7.15.

EXAMPLE 3

N-tert-Butyloxycarbonyl-L-Phenylalanyl-L-Phenylalanine Methyl Ester

Boc-Phe-OH (53 gr, 0.2 moles) is dissolved in a mixture of tetrahydrofuran-dimethylformamide (1:1) (500 ml), mixed with N-methylmorpholine (22 ml) and cooled at −15°C, then isobutylchloroformate (27 ml) is added under stirring. The reaction mixture is stirred for 7 minutes and then a solution of PheOMe . HCl (44 gr, 0.2 moles) and N-methylmorpholine (22 ml) in dimethylformamide is added and the mixture is allowed to reach room temperature overnight.

The triethylamine hydrochloride salt which separates is filtered out and the filtrate is evaporated to a small volume. The residue is treated with an excess of water to give an oily compound which crystallizes after 30 minutes. The crystalline solid is washed on the filter with 5 percent KHSO$_4$, water, 5 percent KHCO$_3$, water and dried to afford a solid in a yield of 80 gr (96 percent) of the above-titled product; R$_f$ (EtOAc-Hexane, 1:1) 0.90.

Anal. Cald. for C$_{24}$H$_{30}$N$_2$O$_5$ (426.5): C 67.59, H 7.09, N 6.56. Found: C 67.09, H 6.97, N 6.63

EXAMPLE 4

N-tert-Butyloxycarbonyl-L-Phenylalanyl-L-Phenylalanine

BOC-Phe-Phe-OMe (122 gr, 0.29 moles) of Example 3 is dissolved in methanol-dioxane-acetone (ca. 1000 ml, 1:1:1) and treated with 1 N sodium hydroxide solution for 3 hours. The basic solution is neutralized with dilute hydrochloric acid (pH 7) and then most of the organic solvent is removed in vacuo. The residue is diluted with water and acidified with 5 percent KHSO$_4$ aqueous, to afford a crystalline solid which is washed with water and dried to yield 73 gr (62 percent) of the above-titled product; mp. 93°–95°C.

Anal. Cald. for C$_{23}$H$_{28}$N$_2$O$_5$ (412): C 66.99, H 6.80, N 6.80. Found: C 66.62, H 6.68, N 6.78

EXAMPLE 5

N-tert-Butyloxycarbonyl-L-Phenylalanyl-L-Phenylalanyl-L-tryptophan Methyl Ester

BOC-Phe-Phe-OH (41.2 gr, 0.1 moles) of Example 4 is dissolved in dimethylformamide-tetrahydrofuran (250 ml, 1:1:1) and mixed with N-hydroxysuccinimide (14 gr), then Trp-OMe.HCl (25.45 gr, 0.1 moles) and triethylamine (13.9 ml). The mixture is cooled in an ice bath and treated with DCC (21 gr, 0.12 moles) for 2 hours in the ice bath then overnight at room temperature. The dicyclohexylurea (DCU) which separates is filtered off and the filtrate is concentrated to half its volume then an excess of water is added to afford a gummy solid which is taken in EtOAc and washed with 5 percent KHSO$_4$, water, 5 percent KHCO$_3$, water, dried over Na$_2$SO$_4$ and evaporated to dryness. The residue is solidified from EtOAc-Et$_2$O-hexane, then from hexane, to afford a powder in a yield of 57 gr (93 percent) of the above-titled product. R$_f$ (EtOAc-Heptane) 0.55 and an impurity at 0.05.

A portion of this material (10 gr) is chromatographed through a column of silica gel (4.5 × 55 cm) and eluted with EtOAc-Hexane (1:1) to give a white solid, 6.4 gr (64 percent) chromatographically homogeneous. mp. 113°–116°C dec.

Anal. Calc. for C$_{35}$H$_{40}$N$_4$O$_6$ (612.7): C 68.61, H 6.58, N 9.15. Found: C 68.74, H 6.70, N 9.32.

EXAMPLE 6

N-tert-Butyloxycarbonyl-L-Phenylalanyl-L-Phenylalanyl-L-Tryptophan

BOC-Phe-Phe-Trp-OMe (5.5 gr, 9 m moles) is dissolved in methanol (25 ml) and treated with 1 N-NaOH (12 ml) for 3 hours at room temperature. The organic solvent is evaporated to a small volume and the residue is diluted with water then acidified with 5 percent KHSO$_4$ to give a white precipitate which is filtered, washed with water and dried. Yield is 5 gr, (93 percent); R$_f$ (CHCl$_3$-MeOH-AcOH, 85:10:5) 0.80 trace at 0.05; mp. 140°–142°C.

Anal. Cald. for C$_{34}$H$_{38}$N$_4$O$_6$.3 H$_2$O (652.6): C 62.56, H 6.79, N 8.57. Found: C 62.52, H 6.03, N 8.76.

EXAMPLE 7

N-tert-Butyloxycarbonyl-L-Phenylalanyl-L-Phenylalanyl-L-Tryptophyl-N$^\epsilon$-Benzyloxycarbonyl-L-Lysine Methyl Ester Boc-Phe-Phe-Trp-OH (10 gr, 16.7 m moles) of Example 6 is mixed with Lys(CBz)OMe . HCl salt (5.6 gr, 17 m moles) in dimethylformamide (150 ml) and triethylamine (2.32 ml) is added followed by N-hydroxysuccinimide (2.3 gr). The mixture is cooled in an ice bath then 4.12 gr of dicyclohexylcarbodiimide (DCC) is added under stirring. It is kept for 2 hours in the ice bath and for 20 hours at room temperature after which time the DCU which separates is filtered off and the filtrate is treated with an excess of water to precipitate a gummy material. This material is taken in EtOAc and the organic phase is washed with 5 percent citric acid, brine, 5 percent $Na_2CO_3$, brine, and dried over $Na_2SO_4$ for a short time then concentrated to a small volume and treated with an excess of $Et_2O$ to afford a crystalline solid in a yield of 11.7 gr (80 percent) of the above-titled product; mp. 159° –160°C; $R_f$ ($CHCl_3$-MeOH-AcOH, 85:10:5) 0.75.

EXAMPLE 8

N-tert-Butyloxycarbonyl-L-Phenylalanyl-L-Pheylalanyl-L-Tryptophyl-N$^\epsilon$-Benzyloxycarbonyl-L-Lysine BOC-Phe-Phe-Trp-Lys(Cbz)OMe (8.8 gr, 10 m moles) of Example 7 is dissolved in a mixture of methanol-acetone (150 ml, 1:1) and treated with 1 N-NaOH (12 ml) for 6 hours at room temperature. Acidification with 10 percent citric acid (200 ml) gives a solid which is filtered and washed with water thoroughly to yield 8.5 gr (99 percent) of the above-titled product; mp. 166°–168°C; $[\alpha]_D^{25} = -8.91$ (C 1, DMF); $R_f$ ($CHCl_3$-MeOH, 10:1) 0.30, $R_f$ (n-Butanol-water-pyridine-acetic acid 30:24:20:ಎ) 0.90.

Anal. Cald. for $C_{48}H_{56}N_6)_9$ (860.9): C 66.69, H 6.56, N 9.76. Found: C 66.39, N 6.63, N 9.63.

EXAMPLE 9

N-t-Butyloxycarbonyl-O-benzyl-L-Threonyl-L-Phenylalanine methyl ester

A solution of Boc-L-Thr(Bzl)-OH (61.8 g, 0.2 moles) and N-methylmorpholine (22.4 ml, 0.2 moles) in tetrahydrofuran is cooled to −15°C. Isobutylchloroformate (26.2 ml, 0.2 moles) is added in portions, keeping the temperature between −15° and −10°C. After stirring at −15°C for 15 minutes, a cold mixture of L-Phe-OMe . HCl (43.1 g, 0.2 moles) and N-methylmorpholine (22.4 ml, 0.2 moles) in dimethylformamide is added in portions keeping the temperature between −10° and −5°C. The mixture is stirred at 0°C for 2 hours, and then at room temperature overnight. The filtered reaction mixture is concentrated in vacuo, and the residue taken up in ethyl acetate. The ethyl acetate solution is washed consecutively with 5 percent $KHSO_4$, 5 percent $KHCO_3$, saline, and dried over $Na_2SO_4$. After concentrating in vacuo an oil is obtained which crystallizes on standing. The solid is recrystallized from isopropyl ether-hexane to yield 74.9 g (80 percent) of the above-titled product; mp. 78°–81°C; $[\alpha]_D^{25} = 10.75$ (c 1.023, MeOH); $R_f$ ($CHCl_3$) 0.35.

Anal. Cald. for $C_{26}H_{34}N_2O_6$(470.55): C 66.36, H 7.28, N 5.95. Found: C 66.72, H 7.32, N 5.85.

EXAMPLE 10

N-t-Butyloxycarbonyl-O-Benzyl-L-Threonine-L-Phenylalanine

BOC-Thr(Bzl)-Phe-OMe (23.5 gr, 0.05 moles) of Example 9 is dissolved in a mixture of MeOH -dioxane (200 ml, 1:1) and treated with 1N-NaOH (55 ml) for 3 hours (until starting material cannot be detected by TLC). Most of the solvent is evaporated in vacuo and the residue is diluted with water then it is acidified with 5 percent citric acid. The gum which separates is taken in EtOAc and washed with water (brine) then evaporated to dryness. The residue is crystallized from $Et_2O$-Hexane to yield 19.8 gr (87 percent) of the above-titled product; mp. 118°–119°C; $R_f$ (chloroform-methanol-glacial acetic acid, 85:10:5) 0.80.

EXAMPLE 11

N-tert-Butyloxycarbonyl-O-benzyl-L-threonyl-O-benzyl-L-serine methyl ester

N-tert-butyloxycarbonyl-O-benzyl-L-threonine (30.9 gr, 0.1 mole) is dissolved in dry tetrahydrofuran (200 ml) cooled at −20°C and treated with N-methylmorpholine (11 ml) followed by isobutylchloroformate (13.4 ml). The cold reaction mixture is stirred for 5 minutes at −20°C then treated with a solution of O-benzyl-L-serine methyl ester hydrochloride (25 g, ca. 0.1 moles) containing N-methylmorpholine (11 ml), in dimethylformamide, and the mixture is allowed to reach room temperature overnight.

The solvent is removed in vacuo and the residue is partitioned between water-ethyl acetate. The organic phase is washed with 5 percent citric acid, water, aq. $KHCO_3$, water and dried over $MgSO_4$, then evaporated to dryness to afford an oily residue which crystallizes from ethyl ether-hexane to a jelly like solid in yield of 29 gr; $R_f$ ($CHCl_3$MeOH, 25:1) 0.85; $R_f$ (EtOAc-hexane, 1:1) 0.65.

EXAMPLE 12

N-tert-Butyloxycarbonyl-O-benzyl-L-threonyl-O-benzyl-L-serine

BOC-Thr(Bzl)-Ser(Bzl)-OMe (28.2 gr, 0.0563 moles) of Example 11 is dissolved in methanol (ca. 50 ml) and treated with 1 N sodium hydroxide (75 ml) for 1.5 hours at room temperature. The alkaline solution is neutralized to pH 7 with 10 percent citric acid and most of the methanol is removed in vacuo. The residue is diluted with some water and acidified with 5 percent aq. $KHSO_4$ then extracted with EtOAc. The organic phase is washed with $H_2O$ dried over $Na_2SO_4$ and evaporated to dryness to an oil. The yield is quantitative; $R_f$ (EtOAc-hexane, 1:1) 0.15 (long spot).

EXAMPLE 13

N-tert-Butyloxycarbonyl-O-benzyl-L-threonyl-O-benzyl-L-seryl-S-p- methoxybenzyl-L-cysteine benzyl ester BOC-Thr(Bzl)-Ser(Bzl)-OH (24.3 gr, 50 m moles) of Example 12 is dissolved in acetonitrile and dichlormethane (250 ml, 2:3) and is mixed with HCys(SMBzl)OBzl - TosOH (25 gr, 50 m moles), then with triethylamine (6.9 ml) and N-hydroxybenzotriazole (6.8 gr) and the mixture is cooled in an ice bath.

A solution of DCC (11 gr, 53 m moles) in acetonitrile (50 ml) is added and the reaction mixture is stirred for 2 hours in the cold then for 2 days at room temperature. The DCU which separates is filtered off and the filtrate is evaporated to dryness. The oil residue is partitioned between ethyl acetate-water and the organic phase is washed with 10 percent citric acid, water, $KHCO_3$, brine and dried over $Na_2SO_4$. The solvent is evaporated and the oily residue is crystallized from $Et_2O$-hexane to afford a white solid in a yield of 24.5 gr of the above-titled product; mp. 87°–90°C; $[\alpha]_D^{25} = -14.7$ (C 0.98, DMF); $R_f$ (chloroform-methanol, 25:1) 0.54, traces at 0.4 and 0.3; (heptane-EtOAc, 1:1) 0.64, traces at 0.25; $I_2$ positive.

Anal. Calc. for $C_{44}H_{52}N_3SO_9$ (798.9): C 66.15, H 6.56, N 5.26. Found: C 66.22, H 6.95, N 5.29.

EXAMPLE 14

O-Benzyl-L-Threonyl-O-Benzyl-L-Seryl-S-p-Methoxybenzyl-L-Cysteine Benzyl Ester, Trifluoroacetate BOC-Thr(Bzl)-Ser(Bzl)-Cys(SMBzl)-OBzl (8 gr, 10 m moles) of Example 13 is mixed with anisole (100 m moles) and treated with trifluoroacetic acid (100 ml) for 45 minutes. The solvent is evaporated in vacuo and the residue is dissolved in dry $Et_2O$, then evaporated to dryness in high vacuo to give an oily compound in a yield of 7.2 gr (90 percent) of the above-titled product. $R_f$ (BWA, 4:1:1) 0.9; $R_f$ (Heptane-EtOAc) 0.0–0.1 long spot, $I_2$ positive and ninhydrin positive.

EXAMPLE 15

N-tert-Butyloxycarbonyl-O-benzyl-L-Threonyl-L-Phenylalanyl-O-Benzyl-L-Threonyl-O-Benzyl-L-Seryl-S-p-methoxy Benzyl-L-Cysteine Benzyl Ester BOC-Thr(Bzl)-Phe-OH (9.2 gr, 20 m moles) of Example 10 is dissolved in dimethylformamide (100 ml) and mixed with N-hydroxysuccinimide (3.4 gr) and a solution of Thr(Bzl)-Ser(Bzl)-Cys (SMBzl)OBzl · TFA salt (20 m moles) of Example 14 in dimethylformamide (20 ml) is neutralized with triethylamine to pH 7. The mixture is cooled in an ice bath and treated with DCC (4.5 gr) for 2 hours in the cold then for 2 days at room temperature. The DCU is filtered and the filtrate evaporated to dryness. The residue is triturated with water to give a precipitate which is taken in EtOAc, washed with 5 percent citric acid, water 5 percent $Na_2CO_3$, water dried over $Na_2SO_4$ and evaporated to dryness. The residue is solidified from $Et_2O$-Hexane to yield 17.3 gr (70 percent) of the above-titled product; mp. = 105°–107°C; $[\alpha]_D^{25}$ = –3.6 (c 1, DMF); $R_f$ (CHCl$_3$-MeOH, 10:1) 0.90.

Anal. Cald. for $C_{64}H_{75}N_5SO_{12} \cdot H_2O$ (1156.2): C 66.46, H 6.71, N 6.05. Found: C 66.68, H 6.59, N 6.20.

EXAMPLE 16

N-tert-Butyloxycarbonyl-L-Phenylalanyl-L-Phenylalanyl-L-Tryptophyl-$N^\epsilon$-Benzyloxycarbonyl-L-Lysyl-O-Benzyl-L-Threonyl-L-Phenylalanyl-O-Benzyl-L-Threonyl-O-Benzyl-L-Seryl-S-p-Methoxybenzyl-L-Cysteine Benzyl Ester BOC-Thr(Bzl)-Phe-Thr(Bzl)-Ser(Bzl)-Cys(SMBzl)-OBzl (11.4 gr, 10 m moles) of Example 15 is mixed with 200 m moles anisole (20 ml) and treated with trifluoroacetic acid (200 ml) for 30 minutes in an ice bath and for 30 minutes further at room temperature, then the mixture is evaporated to dryness in high vacuo and the residue triturated with an excess of dry $Et_2O$-pentane to afford a solid in a yield of 11 gr (95 percent) of the above-titled product; $R_f$ (CHCl$_3$-MeOH-AcOH, 85:10:5) 0.55 trace at 0.45.

The above solid (9.37 gr, 8.14 m moles) is dissolved in DMF (ca. 150 ml) and neutralized with triethylamine (1.14 ml) then mixed with BOC-Phe-Phe-Trp-Lys(Cbz)-OH (7 gr, 8.14 m moles) of Example 12 and N-hydroxysuccinimide (1.035 gr) and the mixture is cooled in an ice bath. To the cold mixture DCC (2.06 gr) is added under stirring for 2 hours in the ice bath and for 3 days at room temperature. The DCU which separates is filtered off and the filtrate is treated with an excess of water to give a solid which is washed on the filter thoroughly with 5 percent citric acid, water, 5 percent $Na_2CO_3$, water and dried to yield 18 gr (96 percent) of the above-titled product mp. = 200°–203°C dec; $[\alpha]_D^{25}$ = –5.6 (C 0.5, DMF); $R_f$ (CHCl$_3$-MeOH, 10:1) 0.65 $R_f$ (CHCl$_3$-MeOH-AcOH, 85:10:5) 0.83.

Anal. Cald. for $C_{107}H_{121}N_{11}SO_{18} \cdot H_2O$ (1181.04): C 67.60, H 6.52, N 8.10. Found: C 67.31, H 6.60, N 8.46.

EXAMPLE 17

L-Phenylalanyl-L-PhenylalanyL-L-Tryptophyl-N-Benzyloxycarbonyl-L-Lysyl-O-Benzyl-L-Threonyl-L-Phenylalanyl-O-Benzyl-L-Threonyl-O-Benzyl-L-Seryl-s-p-Methoxybenzyl-L-Cysteine Benzyl Ester Trifluoroacetate BOC-Phe-Phe-Trp-Lys(Cbz)-Thr(Bzl)-Phe-Thr(Bzl)-Ser(Bzl)-Cys (SMBzl)OBzl (3 gr, 1.6 m moles) of Example 16 is mixed with anisole (2 ml, ca. 32 m moles) and then an excess of trifluoroacetic acid is added. The solution is left to stand at room temperature for 1 hour then evaporated to dryness and the residue triturated with dry $Et_2O$ to afford a solid in a yield of 2.8 gr (92 percent) of the above-titled product; $R_f$ (chloroform-methanol-acetic acid, 85:10:5) 0.50; $R_f$ (chloroform-methanol, 10:1) 0.55, trace at 0.25; ninhydrin and $I_2$ positive spots. Amino Acid analysis*: Thr (2) 1.97; Ser (1) 0.76; Phe (3) 3.00; Lys (1) 0.90.

*Numbers in brackets indicate theoretical quantity of the amino acids.

EXAMPLE 18

N-tert-butyloxycarbonyl-S-p-methoxybenzyl-L-cysteinyl-$N^\epsilon$-benzyloxycarbonyl-L-lysyl-L-phenylalanyl-L-phenylalanyl-L-tryptophyl-$N^\epsilon$-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine benzyl ester H-Phe-Phe-Trp-Lys(Cbz)-Thr(Bzl)-Phe-Thr(Bzl)-Ser(Bzl)-Cys (SMBzl)-Obzl.TFA salt (1 gr, 0.53 m moles) of Example 17 is dissolved in DMF (15 ml) and neutralized with triethylamine (0.072 ml) then mixed with N-hydroxysuccinimide (60 mgr) followed by BOC-Cys (SMBzl)-Lys(Cbz)-OH (320 mgr, 0.53 m moles) obtained in Example 2. The mixture is cooled in an ice bath and treated with DCC (120 mgr) for 2 hours in the cold and for 3 days at room temperature.

The DCU which separates is filtered off and the filtrate is treated with an excess of brine to give a white solid which is washed with water, abs. EtOH, MeOH and finally with $Et_2O$ to yield 1.04 gr (83 percent) of the above titled product; mp. 225°–235°C dec. This product is recrystallized from DMF-$H_2O$.

Anal. Calcd. for $C_{132}H_{152}N_{14}S_2O_{23}$ (2366.5): C 66.99, H 6.47, N 8.28, S 2.70. Found: C 67.10, H 6.54, N 8.36, S 3.38

EXAMPLE 19

L-cystinyl-L-lysyl-L-phenylalanyl-L-phenylalanyl-L-tryptophyl-L-lysyl-L-threonyl-L-phenylalanyl-L-threonyl-L-seryl-L-cystine (cyclic I, II disulfide) triacetate salt.

BOC-Cys(SMBzl)-Lys(Cbz)-Phe-Phe-Trp-

Lys(Cbz)-Thr(Bzl)-Phe-Thr(Bzl)-Ser(Bzl)-Cys(SMBal)-OBzl (1 gr, 0.42 m moles) of Example 18 is mixed with 4 ml anisole and treated for 30 minutes at room temperature with liquid HF after which time the excess HF is evaporated as fast as possible (ca. 1 hour) to yield the deprotected compound L-cysteinyl-L-lysyl-L-phenylalanyl-L-phenylalanyl-L-tryptophyl-L-lysyl-L-threonyl-L-phenylalanyl-L-threonyl-L-seryl-L-cysteine. This residue is washed with dry $Et_2O$ (flushed with hydrogen) and then in 0.01 M ammonium acetate solution (2 l)) which is flushed with nitrogen. The pH is brought to 9.2 with a few drops of dilute $NH_4OH$ and left to stand for 2 days, then lyophilized twice to yield a white fluffy solid 611 mgr (> 100 percent, some $NH_4OCOCH_3$ present).

This crude product (556 mgr) is chromatographed through a column of Sephadex G-25 (2.5 × 30 cm) which is equilibrated first with the lower phase of a biphasic system, n-butanol-acetic acid-water, 4:1:5, then with the upper phase of the system. Fractions of 6.9 ml volume are collected and the material is located by the Folin-Lowry method.

Three main peaks emerge from the column between fractions 53–72 (A), 73–79 (B) and 80–95 (C). The fractions 80–95 (C) are pooled and lyophilized to yield 84 mgr of a fluffy solid which is the above titled product.

$R_f$ (n-butanol-water-acetic acid) 0.45; $R_f$ (isopropanol-1 N-$NH_4OH$, 2:1) 0.75.

Amino acid analysis: Thr (2) 1.81; Ser (1) 0.93; Phe (3) 2.97; Lys (2) 2; Cys (2) 1.70; Trp (1) not determined.

The growth hormone release inhibiting activity of the compound of Example 19 was determined by radioimmunoassay in a rat pituitary cell culture system as described by Vale et al., Endocrinology 91, pp 562 (1972) and Grant et al., Biochemical and Biophysical Research Communications 51, pp 100–106 (1973). The compound of Example 19 was found active in inhibiting growth hormone release at a concentration as low as 50 ng/ml.

The compound of formula I described herein may be administered to warm blooded mammals, including humans, either intravenously, subcutaneously, intramuscularly or orally to inhibit the release of growth hormone where the host being treated requires therapeutic treatment for excess secretion of somatotropin which is associated with conditions such as juvenile diabetes and acromegaly. The contemplated dose range for oral administration in tablet or capsule form to large mammals is about 0.015 mg to about 7 mg/kg of body weight per day while the dose range for intravenous injection in an aqueous solution is about 0.1 g to about 0.15 mg/kg of body weight per day. When administered subcutaneously or intramuscularly a dose range of about 1.5 g to about 7 mg/kg of body weight per day is contemplated. Obviously, the required dosage will vary with the particular condition being treated, the severity of the condition and the duration of treatment.

If the active ingredient is administered in tablet form the tablet may contain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

FLOW DIAGRAM

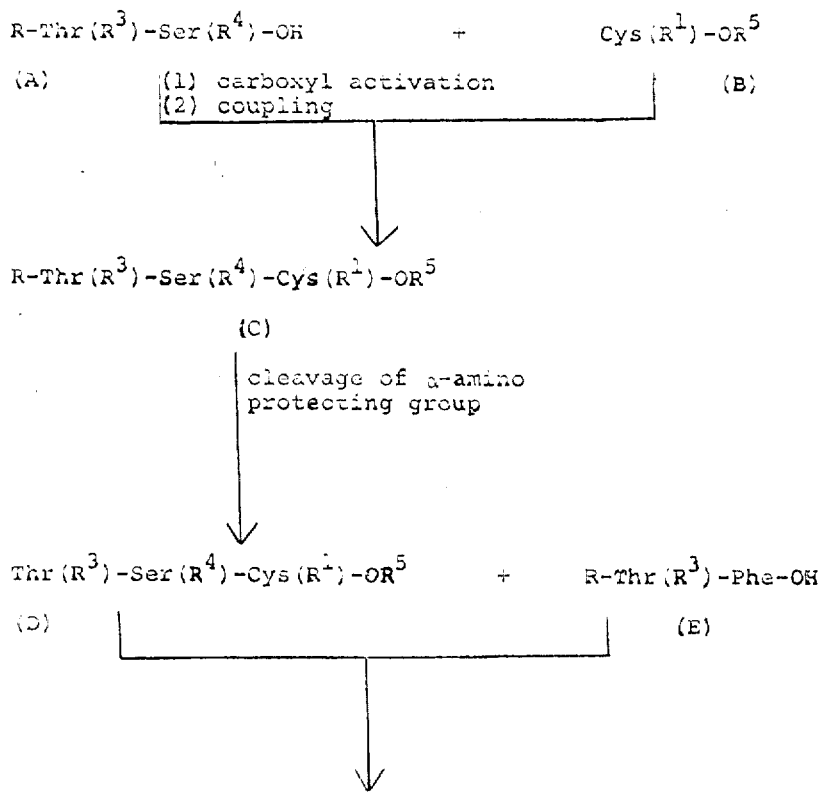

R-Thr(R³)-Phe-Thr(R³)-Ser(R⁴)-Cys(R¹)-OR⁵           (F)

↓ cleavage of α-amino protecting group

Thr(R³)-Phe-Thr(R³)-Ser(R⁴)-Cys(R¹)-OR⁵   +   R-Phe-Phe-Trp-Lys(R²)-OH (G)         (1) carboxyl activation         (H)
           (2) coupling

↓

R-Phe-Phe-Trp-Lys(R²)-Thr(R³)-Phe-Thr(R³)-Ser(R⁴)-Cys(R¹)-OR⁵

(J)

↓ cleavage of α-amino protecting group

Phe-Phe-Trp-Lys(R²)-Thr(R³)-Phe-Thr(R³)-Ser(R⁴)-Cys(R¹)-OR⁵

(K)

Phe-Phe-Trp-Lys(R²)-Thr(R³)-Phe-Thr(R³)-Ser(R⁴)-Cys(R¹)-OR⁵  +  R-Cys(R¹)-
Lys(R²)-OH         (K)     (1) carboxyl activation    (L)
                    (2) coupling

↓

R-Cys(R¹)-Lys(R²)-Phe-Phe-Trp-Lys(R²)-Thr(R³)-Phe-Thr(R³)-
Ser(R⁴)-Cys(R¹)-OR⁵         (M)

↓ cleavage of α-amino and side chain protecting groups

H-Cys-Lys-Phe-Phe-Trp-Lys-Thr-Phe-Thr-Ser-Cys-OH (II)

↓ oxidation

⌐―――――――――――――――――――――――――¬
H-Cys-Lys-Phe-Phe-Trp-Lys-Thr-Phe-Thr-Ser-Cys-OH (I)

What is claimed is:

1. An undecapeptide selected from those of the formula:

H-Cys-Lys-Phe-Phe-Trp-Lys-Thr-Phe-Thr-Ser-Cys-OH,

H-Cys-Lys-Phe-Phe-Trp-Lys-Thr-Phe-Thr-Ser-Cys-OH and the non-toxic acid addition salts thereof, said amino acid residues in said undecapeptide having an asymmetric α-carbon being of the L-configuration.

2. A compound according to claim 1 which is: L-cysteinyl-L-lysyl-L-phenylalanyl-L-phenylalanyl-L-tryptophyl-L-lysyl-L-threonyl-L-phenylalanyl-L-threonyl-L-seryl-L-cysteine and a non-toxic acid addition salt thereof.

3. An undecapeptide of the formula:

R-Cys($R^1$)-Lys($R^2$)-Phe-Phe-Trp-Lys($R^2$)-Thr($R^3$)-Phe-Thr($R^3$)-Ser($R^4$)-Cys($R^1$)-O$R^5$ wherein:
  R is selected from the group consisting of hydrogen or an α-amino protecting group;
  $R^1$ is a protecting group for the sulfhydryl group on the cysteinyl amino acid residue selected from the group consisting of benzyl, trityl, benzyloxycarbonyl, benzhydryl, tetrahydropyranyl, acetamidomethyl, benzoyl, benzylthiomethyl, ethylcarbonyl, thioethyl, p-methoxybenzyloxycarbonyl, sulfate salt and substituted benzyl wherein said substituent is selected from the group consisting of methyl, methoxy and nitro;
  $R^2$ is selected from the group consisting of hydrogen and a protecting group for the side chain amino substituent of the lysine residue selected from the group consisting of benzyl, chlorobenzyloxycarbonyl, tosyl, 2,4-dinitrophenyl, t-amyloxycarbonyl, t-butyloxycarbonyl and benzyloxycarbonyl;
  $R^3$ and $R^4$ are protecting groups for the alcoholic hydroxyl group of the threonine and serine residues selected from the group consisting of acetyl, tosyl, benzoyl, tert-butyl, trityl, benzyl and benzyloxycarbonyl; and
  $R^5$ is a α-carboxyl protecting group selected from the class consisting of $C_1$–$C_6$ alkyl, benzyl, substituted benzyl, phenacyl, phthalimidomethyl, 3-methylthioethyl, 4-picolyl and 4-(methylthio) phenyl, said substituent on benzyl being selected from at least one of methyl, methoxy and nitro; and the acid addition salts thereof, said amino acid residues in said undecapeptide having an asymmetric α-carbon atom being of the L-configuration.

4. A compound according to claim 3 wherein R is tert-butyloxycarbonyl.

5. A compound according to claim 4 wherein $R^1$ is p-methoxybenzyl, $R^2$ is benzyloxycarbonyl, $R^3$ and $R^4$ are benzyl and $R^5$ is benzyl.

6. A compound according to claim 1 which is: L-cystinyl-L-lysyl-L-phenylalanyl-L-phenylalanyl-L-tryptophyl-L-lysyl-L-treonyl-L-phenylalanyl-L-threonyl-L-seryl-L-cystine (cyclic 1, 11 disulfide) and a non-toxic acid addition salt thereof.

* * * * *